Figure 1:
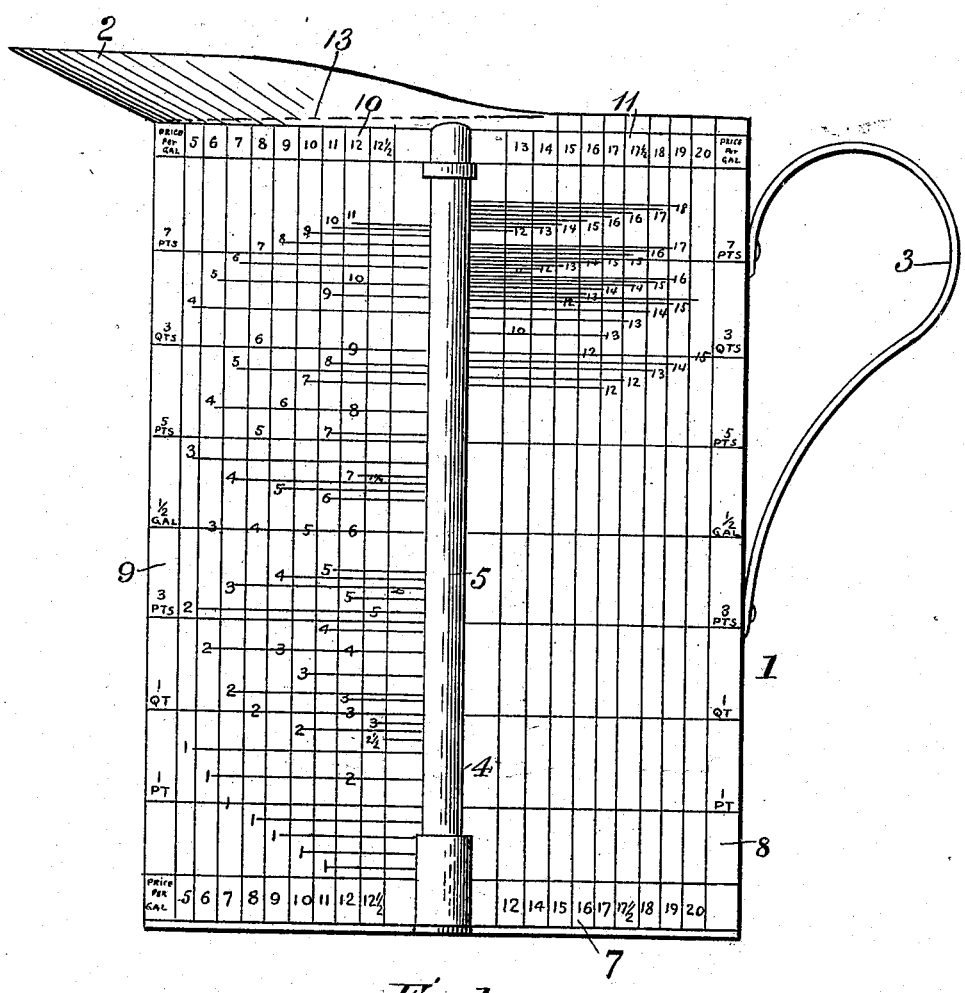

S. E. BLIZARD.
LIQUID MEASURE.
APPLICATION FILED MAY 6, 1907.

923,618.

Patented June 1, 1909.
2 SHEETS—SHEET 1.

Witnesses:
S. S. Burket.
J. M. Mister.

Inventor:
Samuel E. Blizard.
By
Attorneys

S. E. BLIZARD.
LIQUID MEASURE.
APPLICATION FILED MAY 6, 1907.
923,618.
Patented June 1, 1909.
2 SHEETS—SHEET 2.
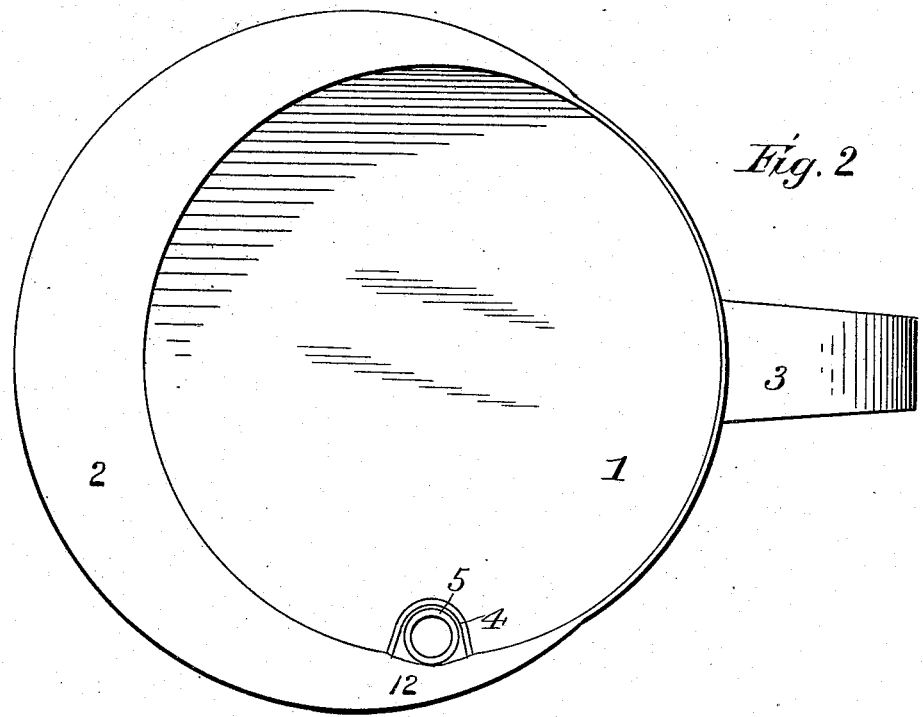
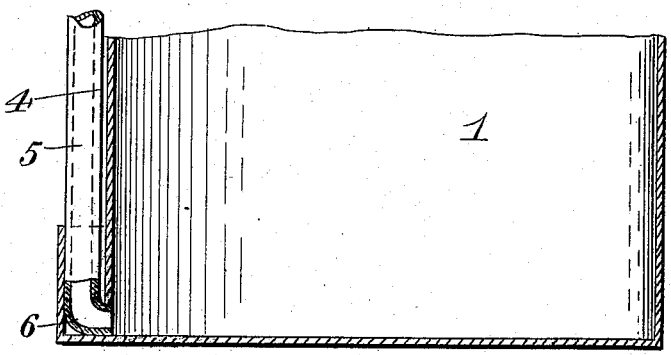

UNITED STATES PATENT OFFICE.

SAMUEL EARL BLIZARD, OF FRANKLIN, INDIANA.

LIQUID-MEASURE.

No. 923,618.  Specification of Letters Patent.  Patented June 1, 1909.

Application filed May 6, 1907. Serial No. 372,251.

*To all whom it may concern:*

Be it known that I, SAMUEL EARL BLIZARD, a citizen of the United States, residing at Franklin, in the county of Johnson and State of Indiana, have invented certain new and useful Improvements in Liquid-Measures, of which the following is a specification.

My invention relates to improvements in liquid measures. Its objects are to provide for readily ascertaining the price of the measured liquid or contents of the vessel or measure especially from readings upon the latter; and to carry out that end in a simple, expeditious and convenient manner.

Said invention consists of certain features or instrumentalities substantially as hereinafter fully disclosed and specifically pointed out by the claim.

In the accompanying drawing illustrating the preferred embodiment of my invention—Figure 1 is a side elevation thereof. Fig. 2 is a plan view of the same. Fig. 3 is a vertical section of the invention, produced alongside of the column glass or tube.

In carrying out my invention, I employ a suitable vessel 1 preferably cylindric in its general outline, having a suitable spout 2 and handle 3, for liquid-measuring purposes. Said vessel or measure has formed laterally therein a longitudinal or vertical recess 4 opening outward and extending from the very top of the vessel clear to the bottom thereof suitably for receiving, and within which is arranged and suitably secured a transparent or glass column or tube 5, this plan being adopted when the vessel is of metal or other opaque material, since the vessel itself may be of glass, or transparent, in that event, however, said tube being omitted and equivalent means therefor being provided, as will hereinafter be explained. Said tube or column has its lower end slightly curved laterally as at 6 and opening into the vessel or measure at its bottom to allow the contents thereof to enter and ascend said tube in column form for disclosing the height of said contents in the measure or vessel as will be readily appreciated. Using in the present instance, said transparent or glass tube 5 as a dividing line, I suitably mark or scribe upon the vessel or measure 1, at opposite sides of said line, certain indicia, as longitudinal columns 7, containing computations based upon certain standards or units of value, as will be further noted later, also additional like columns 8 and 9 flanking the aforesaid columns; and across these columns, horizontal spaced off lines 10, 11 are produced, at the extreme top edge of the measuring capacity of the vessel 1.

The headlines 10, 11, which are opposite certain suggestive headings as indicated, contain between them data or numerals readable in connection with the computations or figures in the vertical cloumns 7, as for example, the "7", third indicia space from and at the left of said tube, may be read with the "11" at the top between the headlines 10, which will provide, by pouring into the vessel 1 an amount of liquid rising in the tube 5 to a line connecting the "7" to said tube, for measuring seven cents' worth of the liquid at eleven cents per gallon. Taking as another example, the "14" in the seventh column at the right of said tube 5, may be read with the "18" at the top between the headlines 11, which will provide, by pouring into the vessel 1, an amount of liquid rising in the tube 5 to a line connecting the "23" to said tube, for measuring fourteen cents' worth of the liquid at eighteen cents per gallon. It will be understood that the indicia or figures, as expressed by the computations arranged in the two series of colums designated as 7 at the right and left of the tube 5 have, of course, all been previously worked out according to mathematical rules, giving the rates of prices of any measured portion of the liquids for vending, including the same for any fractional part of such measurement as indicated. Also it will be noted that the graduations of the two series or tables of computations are clearly differentiated from each other to provide for effecting the minutest measurements as will be readily understood. It is further noted that the vessel or measure 1 has a fixed predetermined depth, say eight inches and that the spout 2 which is suitably fixed or soldered to said vessel, has its bottom forward edge practically alined with the very top edge of said vessel or measure. Said spout has, however, a lateral extension or elongation 12 curving around outwardly from and just in rear of the tube 5, where it joins the can or vessel 1, said extension standing above the top edge of said tube, to provide for the reception and retention of any surplus liquid which may result from the over-pouring of said liquid especially as in filling the can or vessel to its maximum measuring capacity, the liquid overflowing said tube as it would also the can or vessel, and thus prevent the spilling or overflowing of the liquid exteriorly of the can or vessel, as would otherwise result, as is apparent. The remaining upper edge portion of the vessel or measure 1 it will be observed extends laterally and rearward from its upper forward edge slightly above just the upper limit or outline of its measuring capacity as indicated by dotted lines at 13, which provides for the attachment of the corresponding portions of said spout to said vessel or measure above said limiting point or outline, thus guarding against the incidental spilling or overflowing of the contents of the measure or vessel when the latter shall be filled to its complete measuring capacity.

I claim—

A measuring vessel, having an indicating tube with its lower end opening thereinto, and having marked thereon tables of computations suggestive of the amount of the contents of said vessel and the selling price of such contents, said vessel having a spout formed with an extension or elongation curving around and just rearwardly of the upper end of said indicating tube and standing outwardly therefrom and connecting with said vessel just beyond said tube as and for the purpose set forth.

In testimony whereof I affix my signature, in presence of two witnesses.

SAMUEL EARL BLIZARD.

Witnesses:
 EDWIN HOUGHAM,
 LUTHER SHORT.